(12) United States Patent
Wang et al.

(10) Patent No.: US 10,703,869 B2
(45) Date of Patent: Jul. 7, 2020

(54) POLYETHYLENE BLEND-COMPOSITION SUITABLE FOR BLOWN FILMS, AND FILMS MADE THEREFROM

(71) Applicant: Dow Global Technologies LLC, Midland, MI (US)

(72) Inventors: Jian Wang, Rosharon, TX (US); Nilesh R. Savargaonkar, Pearland, TX (US); Mehmet Demirors, Pearland, TX (US); John W. Garnett, IV, Omaha, NE (US)

(73) Assignee: Dow Global Technologies LLC, Midland, MI (US)

( * ) Notice: Subject to any disclaimer, the term of this patent is extended or adjusted under 35 U.S.C. 154(b) by 462 days.

(21) Appl. No.: 14/388,735

(22) PCT Filed: May 22, 2013

(86) PCT No.: PCT/US2013/042141
§ 371 (c)(1),
(2) Date: Sep. 26, 2014

(87) PCT Pub. No.: WO2014/003926
PCT Pub. Date: Jan. 3, 2014

(65) Prior Publication Data
US 2015/0132514 A1    May 14, 2015

Related U.S. Application Data

(60) Provisional application No. 61/664,318, filed on Jun. 26, 2012.

(51) Int. Cl.
*C08L 25/00*    (2006.01)
*C08J 5/18*    (2006.01)
(Continued)

(52) U.S. Cl.
CPC ............ *C08J 5/18* (2013.01); *B29C 48/10* (2019.02); *C08L 23/08* (2013.01);
(Continued)

(58) Field of Classification Search
CPC ...... C08J 5/18; C08J 2323/08; C08L 23/0815; C08L 23/06; B32B 27/08
(Continued)

(56) References Cited

U.S. PATENT DOCUMENTS 6,130,293 A * 10/2000 Hitchcock ............... C08J 5/18
525/191
6,447,875 B1    9/2002 Norquist et al.
(Continued)

FOREIGN PATENT DOCUMENTS

JP    2008163066    7/2008
WO   WO2007078536   7/2007
(Continued)

OTHER PUBLICATIONS

Chinese Office Action dated Feb. 26, 2016; from Chinese counterpart Application No. 201380041419.5.
(Continued)

*Primary Examiner* — Ellen S Hock
(74) *Attorney, Agent, or Firm* — Brooks, Cameron & Huebsch, PLLC (57) ABSTRACT

The instant invention provides a polyethylene blend-composition suitable for blown films, and films made therefrom. The polyethylene blend-composition suitable for blown films comprises the melt blending product of: (a) from 0.5 to 4 percent by weight of a low density polyethylene having a density in the range of from 0.915 to 0.935 g/cm³, and a melt index ($I_2$) in the range of from greater than 0.8 to less than or equal to 5 g/10 minutes, and a molecular weight distribution ($M_w/M_n$) in the range of from 6 to 10; (b) 90
(Continued)

percent or greater by weight of an ethylene/α-olefin interpolymer composition, wherein ethylene/α-olefin interpolymer composition has a Comonomer Distribution Constant (CDC) in the range of from 75 to 200, a vinyl unsaturation of less than 0.1 vinyls per one thousand carbon atoms present in the backbone of the ethylene/α-olefin interpolymer composition; a zero shear viscosity ratio (ZSVR) in the range from 2 to 20; a density in the range of from 0.903 to 0.950 g/cm$^3$, a melt index ($I_2$) in a range of from 0.1 to 5 g/10 minutes, a molecular weight distribution ($M_w/M_n$) in the range of from 1.8 to 3.5; (c) optionally a hydrotalcite based neutralizing agent; (d) optionally one or more nucleating agents; (e) and optionally one or more antioxidants.

8 Claims, 2 Drawing Sheets

(51) Int. Cl.
   *C08L 23/08* (2006.01)
   *B29C 48/10* (2019.01)
   *B29K 23/00* (2006.01)

(52) U.S. Cl.
   CPC .. *C08L 23/0815* (2013.01); *B29K 2023/0658* (2013.01); *C08J 2323/08* (2013.01); *C08J 2423/06* (2013.01); *C08L 2203/16* (2013.01); *C08L 2205/025* (2013.01); *Y10T 428/1352* (2015.01)

(58) Field of Classification Search
   USPC .................. 428/34.7, 35.1; 525/191, 240
   See application file for complete search history.

(56) References Cited

U.S. PATENT DOCUMENTS

| | | | |
|---|---|---|---|
| 6,545,094 | B2 | 4/2003 | Oswald |
| 6,870,010 | B1 | 3/2005 | Lue |
| 7,229,678 | B2 * | 6/2007 | Reighard ............... B32B 27/08 427/411 |
| 8,088,704 | B2 | 1/2012 | Kolb |
| 8,829,115 | B2 | 9/2014 | Hermel-Davidock et al. |
| 2006/0047077 | A1 | 3/2006 | Tas |
| 2010/0317804 | A1 | 12/2010 | Karjala et al. |
| 2011/0003940 | A1 * | 1/2011 | Karjala ............... C08F 10/00 525/240 |
| 2011/0060075 | A1 * | 3/2011 | Oobayashi ........... C08L 23/10 523/351 |
| 2013/0225738 | A1 | 8/2013 | Osby et al. |

FOREIGN PATENT DOCUMENTS

| | | |
|---|---|---|
| WO | 2010144784 | 12/2010 |
| WO | 2011002868 | 1/2011 |
| WO | WO2012087070 | 6/2012 |

OTHER PUBLICATIONS

EP Office Action dated Dec. 15, 2015; from EP counterpart Application No. 12737657.2.
Karjala, et al Detection of low levels of long-chain branching in polyolefins. Annual Technical Conference—Society of Plastics Engineers (2008), 66th 887-891.
PCT/US2013/042141,International Search Report and Written Opinion dated Jul. 19, 2013.
PCT/US2013/042141, International Preliminary Report on Patentability dated Dec. 31, 2014.
Usami, "Fine-Branching Structure in High-Pressure, Low-Density Polyethylene by 50.10-MHz 13C NMR Analysis", Macromolecules, vol. 17, (Oct. 1, 1984), pp. 1756-1761.
Veazey, "High Performance LLDPE Blown Film Equipment", J. Plastic Film and Sheeting, vol. 1 (Jan. 1985), pp. 60-67.
Kyowa Chemical, "Halogen Scavenger, DHT-4A", Kyowa Chemical Industry Co., Ltd, Japan (Dec. 1998)-6 pgs.
Ohuchi, et al., "Assignment and Quantitative Analysis of Chain Branching in High Pressure Polymerized Low-Density Polyethylene by Carbon-13 NMR Method"; Bunseki Kagaku, 1981, vol. 30, p. 332-338 (Translation Not Available; Original Document Only) (7 pgs).
Sojo, et al., "Attribution and Quantitative Analysis of Branched Species of High-Pressure Low-Density Polyethylene"; by C-13 NMR; Bunseki Kagaku (1981) vol. 30, pp. 332-338 (7 pgs) (Original Document Only; Translation Not Available).
Chinese Office Action dated Oct. 14, 2016; from Chinese counterpart Application No. 201380042919.0.

\* cited by examiner

POLYETHYLENE BLEND-COMPOSITION SUITABLE FOR BLOWN FILMS, AND FILMS MADE THEREFROM

REFERENCE TO RELATED APPLICATIONS

The present application claims the benefit of U.S. Provisional Application No. 61/664,318, filed on Jun. 26, 2012.

FIELD OF INVENTION

The instant invention relates to a polyethylene blend-composition suitable for blown films, and films made therefrom.

BACKGROUND OF THE INVENTION

The use of polymeric materials such as ethylene-based compositions in an extrusion blown film process is well-known. The extrusion blown film process employs an extruder which heats, melts, and conveys the molten polymeric material and forces it through an annular die. The ethylene-based film is drawn from the die and formed into a tubular shape and eventually passed through a pair of draw or nip rollers. Internal compressed air is then introduced from the mandrel causing the tube to increase in diameter forming a bubble of the desired size. Thus, the blown film is stretched in two directions, namely in the axial direction, i.e. by the use of forced air which expands the diameter of the bubble, and in the lengthwise direction of the bubble, i.e. by the action of a winding element which pulls the bubble through the machinery. External air is also introduced around the bubble circumference to cool the melt as it exits the die. The film width is varied by introducing more or less internal air into the bubble thus increasing or decreasing the bubble size. The film thickness is controlled primarily by increasing or decreasing the speed of the draw roll or nip roll to control the draw-down rate.

The bubble is then collapsed into two doubled layers of film immediately after passing through the draw or nip roll. The cooled film can then be processed further by cutting or sealing to produce a variety of consumer products.

Despite the research efforts in producing the polymeric materials suitable for blown films, there is still a need for a polyethylene blend composition suitable for blown film, providing improved output rates. Furthermore, there is still a need for a method of producing a polyethylene blend composition suitable for blown film, providing improved output rates.

SUMMARY OF THE INVENTION

The instant invention provides a polyethylene blend-composition suitable for blown films, and films made therefrom.

In one embodiment, the instant invention provides a polyethylene blend-composition suitable for blown films comprising the melt blending product of: (a) from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of an ethylene/α-olefin interpolymer composition, wherein ethylene/α-olefin interpolymer composition has a Comonomer Distribution Constant (CDC) in the range of from 75 to 200, a vinyl unsaturation of less than 0.15 vinyls per one thousand carbon atoms present in the backbone of the ethylene/α-olefin interpolymer composition; a zero shear viscosity ratio (ZSVR) in the range from 2 to 20; a density in the range of from 0.903 to 0.950 g/cm$^3$, a melt index ($I_2$) in a range of from 0.1 to 5 g/10 minutes, a molecular weight distribution ($M_w/M_n$) in the range of from 1.8 to 3.5, long chain branching frequency in the range of from 0.02 to 3 long chain branches (LCB) per 1000C; (c) optionally a hydrotalcite based neutralizing agent; (d) optionally one or more nucleating agents; (e) and optionally one or more antioxidants.

In an alternative embodiment, the instant invention provides a blown film comprising the polyethylene blend-composition, as described above.

In an alternative embodiment, the instant invention further provides an article comprising one or more blown films comprising the polyethylene blend-composition, as described above.

In another alternative embodiment, the instant invention further provides a container device comprising: (a) one or more substrates; and (b) one or more layers comprising one or more blown films comprising the polyethylene blend-composition, as described above.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the output rate is improved at least 3 percent relative to a similar linear low density polyethylene.

In an alternative embodiment, the instant invention provides a polyethylene blend-composition suitable for blown films, a blown film, an article and/or a container device, in accordance with any of the preceding embodiments, except that the polyethylene blend-composition has a peak at 32.7 ppm measured via $^{13}$C NMR, indicating the presence of $C_3$ carbon of $C_5$ branch in the LDPE component.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the total haze is improved by at least 15 percent relative to a blown film consisting essentially of a linear low density polyethylene.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the gloss is improved by at least 10 percent relative to a blown film consisting essentially of a linear low density polyethylene.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention provides a polyethylene blend-composition suitable for blown film, and films made therefrom. The term "polyethylene blend-composition," as used herein, refers to a physical blend of at least a low density polyethylene and a linear low density polyethylene, as described herein.

The polyethylene blend-composition suitable for blown film according to the presence invention comprises the melt blending product of: (a) from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene/α-olefin interpolymer composition; a zero shear viscosity ratio (ZSVR) in the range from 2 to 20; a density in the range of from 0.903 to 0.950 g/cm$^3$, a melt index ($I_2$) in a range of from 0.1 to 5 g/10 minutes, a molecular weight distribution ($M_w/M_n$) in the range of from 1.8 to 3.5, long chain branching frequency in the range of from 0.02 to 3 long chain branches (LCB) per 1000C; (c) optionally a hydrotalcite based neutralizing agent; (d) optionally one or more nucleating agents; (e) and optionally one or more antioxidants.

The polyethylene blend-composition has a density in the range of 0.903 to 0.950 g/cm$^3$. All individual values and subranges from 0.903 to 0.950 g/cm$^3$ are included herein and disclosed herein; for example, the density can be from a lower limit of 0.903, 0.905, 0.910, 0915 g/cm$^3$ to an upper limit of 0925, 0.930, 0.940, 0.945, or 0.950 g/cm$^3$. For example, the polyethylene blend-composition may have a density in the range of from 0.917 to 0.925 g/cm$^3$; or in the alternative, from 0.918 to 0.922 g/cm$^3$; or in the alternative, from 0.919 to 0.921 g/cm$^3$.

The polyethylene blend-composition has a melt index ($I_2$) in the range of from 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes, to an upper limit of 1, 2, 3, 4, or 5 g/10 minutes. For example, the polyethylene blend composition may have a melt index ($I_2$) in the range of from 0.2 to 5 g/10 minutes; or in the alternative, from 0.2 to 3 g/10 minutes; or in the alternative, from 0.5 to 2 g/10 minutes.

The inventive polyethylene blend-compositions provide higher melt strength, better bubble stability and higher output rate as well as improved optical properties.

In one embodiment, the polyethylene blend-composition has a peak at 32.7 ppm measured via $^{13}$C NMR indicating the presence of the $C_3$ carbon of a $C_5$ or amyl branch in the LDPE component.

In another embodiment, when the polyethylene blend-composition is formed into a film via a blown film process, the total haze is improved by at least 15 percent, for example from 15 to 45 percent, relative to a blown film consisting essentially of a linear low density polyethylene.

In another embodiment, when the polyethylene blend composition is formed into a film via a blown film process, the gloss is improved by at least 10 percent, for example from 10 to 30 percent, relative to a blown film consisting essentially of a linear low density polyethylene.

In another embodiment, when said polyethylene blend-composition is formed into a film via blown film process, the output rate is improved at least 3 percent, for example from 3 to 10 percent, relative to a similar linear low density polyethylene.

Low Density Polyethylene (LDPE) Component

The polyethylene blend composition suitable for blown film according to the present invention comprises less than or equal to 4 percent by weight of a low density polyethylene (LDPE); for example, from 0.5 to 4 weight percent; or in the alternative, from 0.5 to 3 weight percent; or in the alternative, from 1 to 3.5 weight percent. The low density polyethylene has a density in the range of from 0.915 to 0.935 g/cm$^3$; for example, from 0.915 to 0.925 g/cm$^3$; or in the alternative, from 0.918 to 0.922 g/cm$^3$. The low density polyethylene has a melt index ($I_2$) in the range of from greater than 0.8 to less than or equal to 5 g/10 minutes; for example, from 1 to 3 g/10 minutes; or in the alternative, from 1.5 to 2.5 g/10 minutes. The low density polyethylene has a molecular weight distribution ($M_w/M_n$) in the range of from 6 to 10; for example, from 6 to 9.5; or in the alternative, from 6 to 9; or in the alternative, from 6 to 8.5; or in the alternative, from 7.5 to 9. Such low density polyethylene compositions are commercially available, for example, from The Dow Chemical Company.

LDPE has a long chain branching of at least 2 per 1000 carbon and/or up to 4 per 1000 carbon.

LLDPE Component

The polyethylene blend composition suitable for blown film according to the present invention comprises 90 percent or greater by weight of the ethylene/α-olefin interpolymer composition (linear low density polyethylene (LLDPE)); for example, from 96 to 99.5 weight percent; or in the alternative, from 97 to 99.5 weight percent; or in the alternative, from 96.5 to 99 weight percent. The ethylene/α-olefin interpolymer composition (linear low density polyethylene (LLDPE)) comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant in the range of from greater than from 45 to 400, for example from 75 to 300, or from 75 to 200, or from 85 to 150, or from 85 to 125.

The ethylene-based polymer composition is characterized by having a zero shear viscosity ratio (ZSVR) in the range of from 2 to 20, for example, from 2 to 10, or from 2 to 6, or from 2.5 to 4.

The ethylene/α-olefin interpolymer composition has a density in the range of 0.903 to 0.950 g/cm³. For example, the density can be from a lower limit of 0.903, 0.905, 0.908, 0.910, or 0.912 g/cm³ to an upper limit of 0.925, 0.935, 0.940, 0.945, 0.950 g/cm³.

The ethylene/α-olefin interpolymer composition has a molecular weight distribution ($M_w/M_n$) in the range of from 1.8 to 3.5. For example, the molecular weight distribution ($M_w/M_n$) can be from a lower limit of 1.8, 2, 2.1, or 2.2 to an upper limit of 2.5, 2.7, 2.9, 3.2, or 3.5.

The ethylene/α-olefin interpolymer composition has a melt index ($I_2$) in the range of 0.1 to 5 g/10 minutes. For example, the melt index ($I_2$) can be from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g /10 minutes.

The ethylene/α-olefin interpolymer composition has a molecular weight ($M_w$) in the range of 50,000 to 250,000 daltons. For example, the molecular weight ($M_w$) can be from a lower limit of 50,000, 60,000, 70,000 daltons to an upper limit of 150,000, 180,000, 200,000 or 250,000 daltons.

The ethylene/α-olefin interpolymer composition has a molecular weight distribution ($M_z/M_w$) in the range of less than 4, for example, less than 3, or from 2 to 2.8.

The ethylene/α-olefin interpolymer composition has a vinyl unsaturation of less than 0.15 vinyls per one thousand carbon atoms present in the backbone of the ethylene-based polymer composition.

The ethylene/α-olefin interpolymer composition has a long chain branching frequency in the range of from 0.02 to 3 long chain branches (LCB) per 1000C

In one embodiment, the ethylene/α-olefin interpolymer composition comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene-based polymer composition. The metal complex residues remaining from the catalyst system comprising a metal complex of a polyvalent aryloxyether in the ethylene-based polymer composition may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the ethylene-based polymer composition.

The ethylene/α-olefin interpolymer composition may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The ethylene-based polymer composition may contain from about 0.1 to about 10 percent by the combined weight of such additives, based on the weight of the ethylene-based polymer composition including such additives.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40 ° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as anti-oxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

Additives

The polyethylene blend-composition may further comprise one or more additional additives. Such additives include, but are not limited to, one or more hydrotalcite based neutralizing agents, one or more nucleating agents, one or more antistatic agents, one or more color enhancers, one or more dyes, one or more lubricants, one or more fillers, one or more pigments, one or more primary antioxidants, one or more secondary antioxidants, one or more processing aids, one or more UV stabilizers, and/or combinations thereof. The polyethylene blend-composition may comprise any amounts of such additives. The polyethylene blend-composition may comprise from about 0 to about 10 percent by the combined weight of such additives, based on the total weight of the polyethylene blend composition.

Production

The polyethylene blend-composition is prepared via any conventional melt blending process such as extrusion via an extruder, e.g. single or twin screw extruder. The LDPE, LLDPE, and optionally one or more additives may be melt blended in any order via one or more extruders to form a uniform polyethylene blend-composition.

Applications

The polyethylene blend-composition may be formed into a film via, for example, a blown film process. In one embodiment, when the polyethylene blend-composition is formed into a film via a blown film process, the output rate is improved at least 3 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene. In one embodiment, the polyethylene blend-composition may be formed into a multi-layer blown film structure. In another embodiment, the polyethylene blend-composition may be formed into a single layer or a multi-layer blown film structure associated with one or more substrates. The blown films prepared according to the present invention may be used as lamination films where the blown polyethylene film is adhesively laminated to a substrate such as biaxially oriented polypropylene (BOPP) films or biaxially oriented polyethylene terephthalate (BOPET) films, liner films, sealant webs, shrink films, stretch films, etc. The blown films according to the present invention have a thickness in the range of from 0.3 to 5 mils, for example, 0.5 to 5 mils.

EXAMPLES

The following examples illustrate the present invention but are not intended to limit the scope of the invention. The examples of the instant invention demonstrate that when the polyethylene blend composition is formed into a film via a blown film process, the output rate is improved at least 3 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene.

Inventive Composition 1

Inventive Composition 1 is a polyethylene blend-composition comprising the melt blending product of (a) 3 percent by weight of a low density polyethylene (LDPE) component having a melt index ($I_2$) of approximately 1.85 g/10 minutes, and a density of 0.919 g/cm$^3$, as further defined in Table 1, provided by The Dow Chemical Company; and (b) 97 percent by weight of a linear low density polyethylene 1 (LLDPE 1) component (including 900 parts of DHT-4A per million parts of the LLDPE 1), which is a linear low density polyethylene (LLDPE) were prepared via a solution polymerization process in a dual reactor configuration connected in series in the presence of a catalyst system comprising a metal complex of a polyvalent aryloxyether, as described above, having a melt index ($I_2$) of approximately 0.91 g/10 minutes and a density of approximately 0.918 g/cm$^3$, and further described in Table 1. The properties of the Inventive Composition 1 are measured, and reported in Table 2.

Comparative Composition A

Comparative Composition A is a linear low density polyethylene 1 (LLDPE 1), which is a linear low density polyethylene (LLDPE) were prepared via a solution polymerization process in a dual reactor configuration connected in series in the presence of a catalyst system comprising a metal complex of a polyvalent aryloxyether, as described above, having a melt index ($I_2$) of approximately 0.91 g/10 minutes and a density of approximately 0.918 g/cm$^3$, and further described in Table 1. The properties of the Comparative Composition 1 are measured, and reported in Table 2.

Inventive Films 1

Inventive Compositions 1 is formed into Inventive Film 1 via a blown film process based on the process conditions reported in Table 3. Inventive Films 1, a monolayer film, was tested for its properties, and the results are reported in Table 4. The film properties reported in Table 4 are for films made at maximum rate (approximately 15.3 lb/hr/in or 382 lb/hr).

Comparative Films A

Comparative Compositions A is formed into Comparative Film A via a blown film process based on the process conditions reported in Table 3. Comparative Film A, a monolayer films, is tested for its properties, and the results are reported in Table 4. The film properties reported in Table 4 are for films made at maximum rate (approximately 14.8 lb/hr/in or 370 lb/hr).

Test Methods

Test methods include the following:
Melt index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

Dynamic Shear Rheology

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic viscosity ($\eta$*), and tan ($\delta$) or tan delta were calculated.

Melt Strength

Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

DSC Crystallinity Determination

Differential Scanning calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an autosampler module is used to perform the tests. During testing, a nitrogen purge gas flow of 50 ml/minute is used. Each sample is pressed into a thin film and melted in the press at about 175° C.; the melted sample is then air-cooled to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./minute cooling rate and held at −40° C. for 3 minutes. The sample is then heated to 150° C. at 10° C./minute heating rate. The cooling and second heating curves are recorded. The values determined are peak melting temperature ($T_m$), peak crystallization temperature ($T_c$), the heat of fusion ($H_f$), and the % crystallinity for polyethylene samples calculated using the following Equation:

% Crystallinity=[($H_f$(J/g))/(292 J/g)]×100

The heat of fusion ($H_f$) and the peak melting temperature are reported from the second heat curve. The peak crystallization temperature is determined from the cooling curve.

High Temperature Gel Permeation Chromatography

The Gel Permeation Chromatography (GPC) system consists of a Waters (Milford, Mass.) 150C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$M_{polyethylene} = A \times (M_{polystyrene})^B$, where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

$^{13}$C NMR

The samples were prepared by adding approximately 2.7 g of a 50/50 mixture of tetrachloroethane-$d_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat LDPE.

Crystallization Elution Fractionation (CEF) Method Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600ppm anti-oxidant butylated hydroxytoluene (BHT) is used as solvent. Sample preparation is done with autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min The flow rate during elution is at 0.50 ml/min. The data is collected at one data point/second.

CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, >97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of } \textit{MIST } 1475a - \text{Peak Temperature of Hexacontane}}{\text{Half-height Width of } \textit{MIST } 1475a + \text{Half-height Width of Hexacontane}}$$

where the column resolution is 6.0.

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distribution Index}}{\text{Comonomer Distribution Shape Factor}}$$
$$= \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in the following Equation:

$$CDC = \frac{\text{Comonomer Distribution Index}}{\text{Comonomer Distribution Shape Factor}}$$
$$= \frac{\text{Comonomer Distribution Index}}{\text{Half Width}/Stdev} * 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T(T)$) from 35.0° C. to 119.0° C. with a temperature step increase of 0.200° C. from CEF according to the following Equation:

$$\int_{35}^{119.0} w_t(T)dT = t$$

(B) Calculate the median temperature ($T_{median}$) at cumulative weight fraction of 0.500, according to the following Equation:

$$\int_{35}^{T_{median}} w_T(T)dT = 0.5$$

(C) Calculate the corresponding median comonomer content in mole % ($C_{median}$) at the median temperature ($T_{median}$) by using comonomer content calibration curve according to the following Equation:

$$\ln(1 - comonomercontent) = \frac{207.26}{273.12} + 0533$$
$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material according to the following Equation:

$$\ln(1 - comonomercontent) = \frac{207.26}{273.12} + 0533$$
$$R^2 = 0.997$$

wherein: $R^2$ is the correlation constant;

(F) Calculate Comonomer Distribution Index from the total weight fraction with a comonomer content ranging from $0.5*C_{median}$ to $1.5*C_{median}$; and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according the following Equation:

$$Stdev = \sqrt{\sum_{35.0}^{119.0}(T - T_p)^2 * w_T(T)}$$

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm) Any superfluous material is trimmed off and the upper plate is lowered to the desired gap. Measurements are done under nitrogen purging at a flow rate of 5 L/min Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{OB}}{\eta_{OL}} = \frac{\eta_{OB}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$11 NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral I$_{total}$ from −0.5 to 3 ppm is used as the signal from whole polymer in the control experiment. The number of CH$_2$ group, NCH$_2$, in the polymer is calculated as following:

NCH$_2$=I$_{total}$/2

Figure 1:
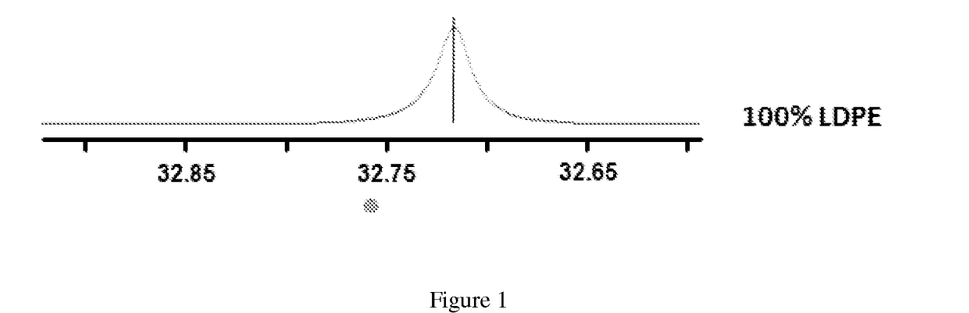
FIG. 1 reports the $^{13}$C NMR spectrum between 32.6 and 32.9 ppm for a low density polyethylene.
Figure 2:
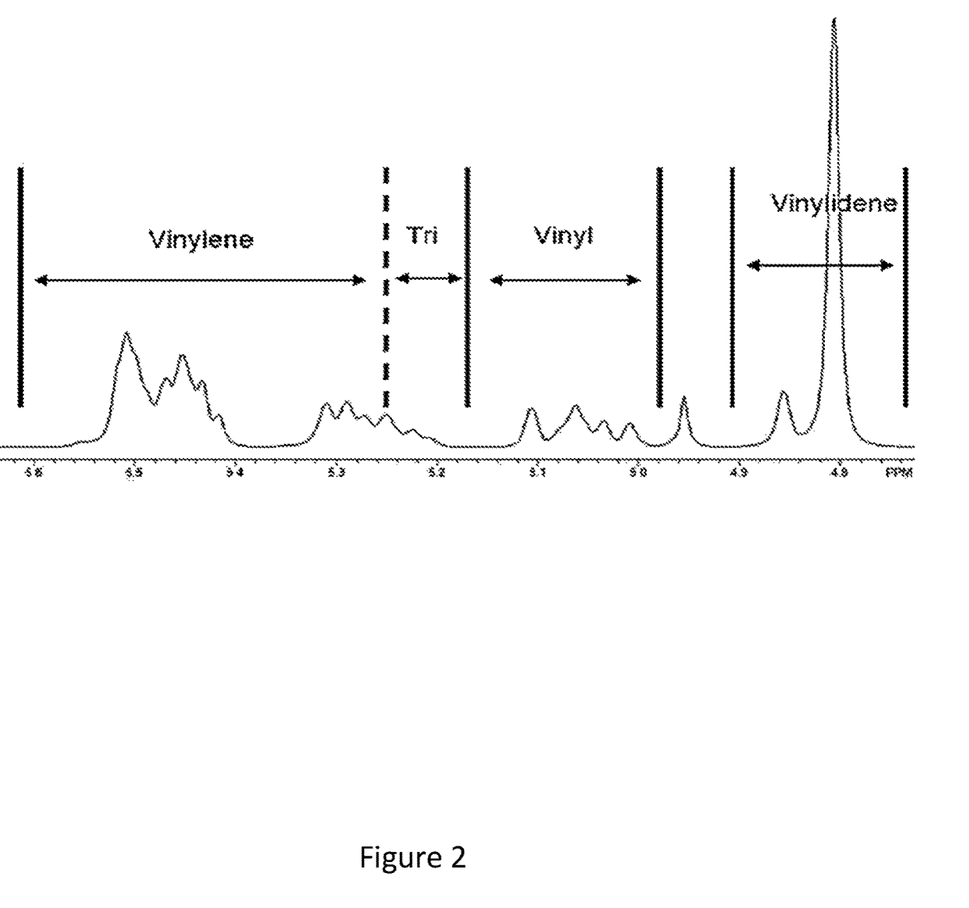
FIG. 2 shows corresponding integrals for unsaturations ($I_{vinylene}$, $I_{trisubstituted}$, $I_{vinyl}$ and $I_{vinylidene}$).

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations (Ivinylene, Itrisubstituted, Ivinyl and Ivinylidene) were integrated based on the region shown in FIG. 2.

The number of unsaturation unit for vinylene, trisubstituted, vinyl and vinylidene are calculated:

N$_{vinylene}$=I$_{vinylene}$/2
N$_{trisubstitued}$=I$_{trisubstitute}$
N$_{vinyl}$=I$_{vinyl}$/2
N$_{vinylidene}$=I$_{vinylidene}$/2

The unsaturation unit/1,000,000 carbons is calculated as following:

N$_{vinylene}$/1,000,000C=(N$_{vinylene}$/NCH$_2$)*1,000,000
N$_{trisubstituted}$/1,000,000C=(N$_{trisubstituted}$/NCH$_2$)*1,000,000
N$_{vinyl}$/1,000,000C=(N$_{vinyl}$/NCH$_2$)*1,000,000
N$_{vinylidene}$/1,000,000C=(N$_{vinylidene}$/NCH$_2$)*1,000,000

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64s, D1 14s. The double presaturation experiment is run with a modified pulse sequence, OIP1.354 ppm, O2P 0.960 ppm, PL9 57db, PL21 70 db, TD 32768, NS 200, DS 4, SWH 10,000 Hz, AQ 1.64s, D1 1 s, D13 13s. The modified pulse sequences for unsaturation with Broker AVANCE 400 MHz spectrometer are shown below:

```
lclprf2_zz
prosol relations=<lcnmr>
;include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1: f1
p1ph1
go=2 ph31
```

-continued

```
30m mc ↓0 to 2 F0(zd)
Exit
ph1=0 2 2 0 1 3 3 1
ph29=0
ph31=0 2 2 0 1 3 3 1
```

Film Testing Conditions
The following physical properties are measured on the films produced:
  Total Haze: Samples measured for overall haze are sampled and prepared according to ASTM D 1746. A Hazegard Plus (BYK-Gardner USA; Columbia, Md.) is used for testing.
  45° Gloss: ASTM D-2457.
  1% Secant Modulus- MD (machine direction) and CD (cross direction): ASTM D-882.
  MD and CD Elmendorf Tear Strength: ASTM D-1922
  Dart Impact Strength: ASTM D-1709, Method A
  Puncture Strength: Puncture strength is measured on a Instron Model 4201 with
  Sintech Testworks Software Version 3.10. The specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kim-wipe" after each specimen.
Determination of Maximum Output Rate of Blown Film
  Film samples are collected at a controlled rate and at a maximum rate. The controlled rate is 250 lb/hr which equals an output rate of 10 lb/hr/inch of die circumference. Note the die diameter used for the maximum output trials is an 8" die so that for the controlled rate, as an example, the conversion between lb/hr and lb/hr/inch of die circumference is shown in Equation 3. Similarly, such an equation can be used for other rates, such as the maximum rate, by substituting the maximum rate in Equation 3 for the standard rate of 250 lb/hr to determine the lb/hr/inch of die circumference.

$$\text{Lb/Hr/Inch of Die Circumference} = (250 \text{ Lb/Hr})/(8*\pi) = 10 \quad \text{(Eq. 3)}$$

The maximum rate for a given sample is determined by increasing the output rate to the point where bubble stability is the limiting factor. The extruder profile is maintained for both samples (standard rate and maximum rate), however the melt temperature is higher for the maximum rate samples due to the increased shear rate. The maximum rate is determined by maximizing both the internal bubble cooling and the external cooling via the air ring. The maximum bubble stability is determined by taking the bubble to the point where any one of the following things was observed (a) the bubble would not stay seated in the air ring (b) the bubble started to lose its shape (c) the bubble started to breathe in and out or (d) the frost line height would become unstable. At that point the rate is reduced to where the bubble is reseated in the air ring while maintaining the shape of the bubble and a steady frost line height and then a sample is collected. The cooling on the bubble is adjusted by adjusting the air ring and maintaining the bubble. This is taken as the maximum output rate while maintaining bubble stability.

Monolayer films were produced. The die diameter is 8 inches, the die gap is 70 mils, the blow up ratio is 2.5, and internal bubble cooling is used.

The present invention may be embodied in other forms without departing from the spirit and the essential attributes thereof, and, accordingly, reference should be made to the appended claims, rather than to the foregoing specification, as indicating the scope of the invention.

TABLE 1

|  | Units | LDPE Component | LLDPE Component |
|---|---|---|---|
| Density | g/cm³ | 0.919 | 0.918 |
| $I_2$ | g/10 min | 1.85 | 0.91 |
| $I_{10}/I_2$ |  | 14.3 | 8.1 |
| Viscosity (0.1 rad/s) | Pa · s | 8,863 | 10,118 |
| Viscosity (1.0 rad/s) | Pa · s | 4,639 | 7,037 |
| Viscosity (10 rad/s) | Pa · s | 1,658 | 4,075 |
| Viscosity (100 rad/s) | Pa · s | 464 | 1,761 |
| Tan Delta (0.1 rad/s) |  | 3.1 | 6.0 |
| Melt Strength | cN | 9.2 | 3.6 |
| $M_n$ | g/mol | 11,628 | 38,419 |
| $M_w$ | g/mol | 94,485 | 91,409 |
| $M_z$ | g/mol | 321,061 | 177,320 |
| $M_w/M_n$ |  | 8.13 | 2.38 |
| $T_{m1}$(DSC) | ° C. | 109.2 | 112.8 |
| $T_{c1}$(DSC) | ° C. | 95.6 | 99.7 |
| $T_{c2}$ (DSC) | ° C. |  | 66.7 |
| Heat of fusion | J/g | 136.8 | 129.6 |
| Vinyl Unsaturation | Per 1000 Carbons | — | 0.122 |
| CDC |  | — | 103 |
| ZSVR |  | — | 3.0 |

TABLE 2

| Polymer Property | Units | Inventive Composition 1 | Comparative Composition A |
|---|---|---|---|
| Density | g/cm³ | 0.919 | 0.918 |
| $I_2$ | g/10 min | 0.89 | 0.91 |
| $I_{10}/I_2$ |  | 8.3 | 8.1 |
| Viscosity (0.1 rad/s) | Pa · s | 10,807 | 10,118 |
| Viscosity (1.0 rad/s) | Pa · s | 7,188 | 7,037 |
| Viscosity (10 rad/s) | Pa · s | 3,983 | 4,075 |
| Viscosity (100 rad/s) | Pa · s | 1,668 | 1,761 |
| Tan Delta (0.1 rad/s) |  | 5.3 | 6.0 |
| Melt Strength | cN | 5.3 | 3.6 |
| $M_n$ | g/mol | 36,080 | 38,419 |
| $M_w$ | g/mol | 91,296 | 91,409 |
| $M_z$ | g/mol | 182,056 | 177,320 |
| $M_w/M_n$ |  | 2.53 | 2.38 |
| $T_{m1}$(DSC) | ° C. | 113.5 | 112.8 |
| $T_{c1}$(DSC) | ° C. | 100.1 | 99.7 |
| $T_{c2}$ (DSC) | ° C. | 66.1 | 66.7 |
| Heat of fusion | J/g | 130.4 | 129.6 |

TABLE 3

| Film Fabrication | Units | Inventive Film 1 | Comparative Film A |
|---|---|---|---|
| Max Output rate | lbs/hr | 382 | 370 |
| Max Output rate | lbs/hr/inch | 15.3 | 14.8 |
| Rate improvement over CE-A | % | 3.2 | 0 |

TABLE 3-continued

| Film Fabrication | Units | Inventive Film 1 | Comparative Film A |
|---|---|---|---|
| Screw Speed (RPM) | RPM | 49.4 | 48.9 |
| Frost Line Height (FLH-inch) | Inch | 70 | 69 |
| External Air (%) | % | 45.4 | 50 |
| IBC Exhaust Air (%) | % | 98.7 | 96.3 |
| IBC Supply Air (%) | % | 36.5 | 35.5 |
| % Full load current | % | 5 | 6 |
| Horsepower | HP | 8 | 6 |
| Barrel P1 (psi) | psi | 5150 | 5110 |
| Barrel P2 (psi) | Psi | 5890 | 5860 |
| Barrel P3 (psi) | Psi | 5260 | 5180 |
| Screen Pressure (psi) | Psi | 4950 | 4940 |
| Adapter P (psi) | Psi | 2510 | 2520 |
| Melt Temp. | °F. | 449 | 446 |
| Temp. Profile (°F.) | | | |
| Barrel T1 | °F. | 350 | 350 |
| Barrel T2 | °F. | 425 | 425 |
| Barrel T3 | °F. | 380 | 380 |
| Barrel T4 | °F. | 325 | 325 |
| Barrel T5 | °F. | 345 | 345 |
| Screen T | °F. | 430 | 430 |
| Adapter T | °F. | 445 | 445 |
| Block T | °F. | 430 | 430 |
| Lower Die T | °F. | 440 | 440 |
| Inner Die T | °F. | 440 | 440 |
| Upper Die T | °F. | 440 | 440 |

TABLE 4

| Film Properties | Units | Inventive Film 1 | Comparative Film A |
|---|---|---|---|
| Film Thickness | mil | 2.0 | 2.0 |
| Dart Impact Resistance-(Method A) | g | 385 | 508 |
| Tear: Elmendorf-MD | g/mil | 282 | 318 |
| Tear: Elmendorf-CD | g/mil | 519 | 500 |
| Puncture | ft*lbf/in$^3$ | 323 | 328 |
| Total Haze | % | 8.7 | 13.7 |
| Gloss | % | 60.7 | 49.6 |
| Secant Modulus-CD(1%) | psi | 32582 | 32686 |
| Secant Modulus-MD(1%) | psi | 30414 | 29349 |

We claim:

1. A polyethylene blend-composition suitable for blown film comprising the melt blending product of:

from 0.5 to 4 percent by weight of a low-density polyethylene having a density in the range of from 0.915 to 0.935 g/cm$^3$, and a melt index ($I_2$) in the range of from 1 to less than or equal to 5 g/10 minutes, and a molecular weight distribution ($M_w/M_n$) in the range of from 6 to 8.5;

from 96 to 99.5 percent by weight of an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene-based polymer composition; a zero shear viscosity ratio (ZSVR) in the range from 2 to 20; a density in the range of from 0.903 to 0.950 g/cm$^3$, a melt index ($I_2$) in a range of from 0.1 to 5 g/10 minutes, a molecular weight distribution ($M_w/M_n$) in the range of from 1.8 to 3.5; and from greater than 0 to 10 percent by weight of a hydrotalcite based neutralizing agent;

optionally one or more nucleating agents;

and optionally one or more antioxidants.

2. The polyethylene blend composition of claim 1, wherein when said polyethylene blend-composition is formed into a film via blown film process, the output rate is improved at least 3 percent relative to a similar linear low density polyethylene.

3. A blown film comprising the polyethylene blend-composition of claim 1.

4. An article comprising one or more blown films comprising the polyethylene blend-composition of claim 1.

5. A container device comprising:
(a) one or more substrates; and
(b) one or more layers comprising one or more blown films comprising the polyethylene blend-composition of claim 1.

6. The polyethylene blend-composition suitable for blown film of claim 1, wherein the polyethylene blend composition has a peak at 32.7 ppm measured via $^{13}$C NMR, indicating the presence of $C_3$ carbon of $C_5$ branch in the LDPE component.

7. The polyethylene blend-composition suitable for blown film of claim 1, wherein when said polyethylene blend composition is formed into a film via a blown film process and the total haze is improved by at least 15 percent relative to a blown film consisting essentially of a linear low density polyethylene.

8. The polyethylene blend-composition suitable for blown film of claim 1, wherein when said polyethylene blend composition is formed into a film via a blown film process and the gloss is improved by at least 10 percent relative to a blown film consisting essentially of a linear low density polyethylene.

* * * * *